3,255,500
FOUNDRY COMPOSITION COMPRISING SAND, DRYING OIL AND POLYISOCYANATE
James J. Engel and Vernon L. Guyer, Minneapolis, and Robert J. Schafer, Edina, Minn., assignors to Archer-Daniels-Midland Company, Minneapolis, Minn., a corporation of Delaware
No Drawing. Filed Apr. 12, 1965, Ser. No. 447,513
17 Claims. (Cl. 22—194)

This is a continuation-in-part of Serial No. 429,675, filed February 1, 1965, now abandoned.

The present invention relates to foundry products and foundry processes. In another aspect, the present invention relates to a foundry process for making cores which harden at room temperature. In still another aspect, the present invention relates to cores comprised of a foundry aggregate (e.g., sand) which has been formed into a coherent mass with the combination of an isocyanate and drying oil, which combination is capable of curing at room temperature.

In the foundry art, cores for use in making metal castings are normally prepared from mixtures of an aggregate material (e.g., sand) which has been combined with a binding amount of a polymerizable or curable binder. Frequently, minor amounts of other materials are also included in these mixtures, e.g., iron oxide, ground flax fibers, and the like. The binder permits such a foundry mix to be molded or shaped into the desired form and thereafter cured to form a self-supporting structure.

Typically, sand is used as the aggregate material. After the sand and binder have been mixed, the resulting foundry sand mix is rammed, blown, or otherwise introduced into a pattern, thereby assuming the shape defined by the adjacent surfaces of the pattern. Then, by the use of catalyst (e.g., chlorine gas) and/or the use of heat, the polymerizable binder is caused to polymerize, thereby converting the formed, uncured, plastic, foundry sand mix into a hard, solid, cured state. This hardening can be accomplished in the original pattern, in a gassing chamber, or in a holding pattern. See U.S. Patent 3,145,438 and 3,121,268, which patents are illustrative of the prior art techniques.

Certain of the prior art processes are quite effective. Unfortunately, the use of core binders (e.g., "hot box binders") which are cured by being subjected to elevated temperatures, e.g., from 225° F. to about 500° F., requires that heating facilities be available. Frequently it is necessary to keep the green cores in the original molds or patterns during this heating period since many heat curable binders (e.g., core oils) do not impart sufficient green strength to cause green cores to retain their desired shape without external support until such time as a final cure can be effected. Likewise, binders which are cured by means of gaseous catalysts often require that gassing chambers be available. Additionally, many of the binders which can be gas cured suffer from the same green strength or stripping strength deficiencies as do the heat curable binders.

In an effort to prepare cores without the necessity for using heat, gaseous catalysts, and the like, various prior attempts have been made to prepare binders which would be capable of curing at room temperature, i.e., at temperatures of from about 45°–120° F., more usually about 60°–90° F. A variety of materials have been developed or suggested for use as binders, but these prior art compositions have suffered from one or more deficiencies. Typical of the deficiencies exhibited by prior art binders alleged to cure at room temperature have been a lack of ability to rapidly impart green strength or stripping strength to cores, a lack of tensile strength, intolerably short bench life of foundry mixes, high toxicity, inability to combine well with all foundry aggregates, high sensitivity to moisture, contamination of the surface of castings, and the creation of pin-holes in castings. In spite of their recognized shortcomings, certain of these room temperature curing binders are widely employed. However, there currently exists a recognized market for any room temperature curing binder which would not have these same shortcomings, particularly where large cores are involved.

We have now discovered a certain class of compositions which are especially useful as core binders. These compositions are capable of air drying at room temperature (i.e., "no-bake binders") to form excellent cores. When used in foundry mixes, the preferred binder compositions of the present invention have the following distinct advantages, particularly where large cores are involved:

(a) The ability to air dry at room temperature;
(b) The ability to quickly impart sufficient stripping strength to green cores to thereby allow them to be stripped from the mold or pattern and then completely cured while unsupported, thus freeing the mold or pattern for subsequent use;
(c) Moisture resistance;
(d) The ability to cure in combination with any aggregate commonly used in the foundry art;
(e) The ability to impart an excellent level of moldability or plasticity to foundry sand mixes containing our no-bake binder;
(f) Good breakdown properties;
(g) The ability to produce a core which can be easily stripped from a mold or pattern;
(h) A curing rate which can be varied from almost instantaneous to any reasonable level, depending upon the choice and amount of catalyst used;
(i) The ability to impart a higher tensile strength to cores;
(j) A realistic bench life which generally parallels the curing rate; and
(k) The ability to form cores which result in excellent castings. With our more preferred compositions, the pin-hole problems of conventional air drying binders are almost eliminated, surface cracks are substantially eliminated, surface contamination is held to a minimum, and casting surfaces are generally clean and smooth.

We do not mean to imply that these are the only advantages of our invention, nor do we mean to imply that all variations of our invention will be outstanding with regard to all of these listed advantages. Rather, when our invention is compared with prior art products and processes, our invention will offer one or more of these listed advantages. However, the best mode of our invention, as presently known to us, offers excellent performance as indicated by all of the listed advantages. Thus, it is possible to follow our teachings and obtain all or a part of these advantages. The extent to which these advantages are obtained will be determined by whether or not one practices the best mode of our invention or departs somewhat from the best mode as disclosed herein.

Broadly described, the binder compositions of our invention are drying oils (e.g., oil-modified alkyd resins) which have been combined with isocyanates (i.e., a urethane precursor), the amount of isocyanate combined with the drying oil being sufficient for the combination to impart stripping strength or green strength to a core formed therefrom. While not wishing to be bound to any theory, we believe that the failures of the prior art binders are overcome in the following manner: the isocyanate first reacts, probably with moisture or other available hydroxyl groups, and imparts stripping strength to the core, especially at the critical surface adjacent the pattern where a drying oil, per se, does not ordinarily harden since air does not readily reach that surface. After the core has developed sufficient stripping strength (e.g., 45 minutes), it is removed from the pattern. Since the core is self-supporting and can be completely exposed to the air, the second phase of our hardening process comes into play. Here, the drying oil reacts with oxygen of the air and further hardens the core, thereby imparting the desired hardness and ultimate tensile strength to the core.

Without the isocyanate, most drying oils do not impart sufficient stripping strength to cores at room temperature to allow them to be removed from a pattern in any reasonable amount of time, unless, of course, air is first forced into the core. The poor curing ability of the drying oils, alone, becomes more pronounced as larger and larger cores are involved.

Similarly, drying oils which do impart an acceptable level of stripping strength, often do not produce an acceptacle tensile strength in a reasonable amount of time when cured by air drying at room temperature. Where higher tensile strengths are needed (and generally they are), cores formed from the latter mentioned drying oils, per se, must be baked to achieve the desired level of tensile strength.

The deficiencies of the drying oils, per se, (e.g., octicica oil, linseed oil, ordinary alkyd resins, and the like) can be better understood by observing what happens to a core prepared from a foundry sand mix containing such a drying oil. Although the surface of the core which is exposed to the air does harden, the depth of this hardening or cure is not ordinarily adequate. In large green cores (e.g., cores 18 inches deep) having only the top surface exposed to the air, with the sides and bottom being in contact with a pattern, drying oils have been observed to give no measurable degree of hardening in the center of the core and at the bottom of the core, even after two hours at room temperature. Consequently, cores containing drying oils, alone, must usually be baked, ordinarily for relatively long periods of time, before they can be removed from a pattern.

In contradistinction, we have found that our binder compositions are quite effective. The advantages of our invention over the prior art become more pronounced as larger and larger cores are involved. Because of this, we prefer to use our invention in combination with cores which are at least four inches deep (measured from an exposed surface when the green core is in a pattern or mold). More preferably, we use our invention in combination with cores which are at least eight inches deep (on the same basis). Obviously, our invention can be used with both smaller cores (e.g., two inches deep) and larger cores (e.g. twenty-five inches deep). However, as previously indicated, the advantages of our invention become more pronounced when compared with prior art binders, both being used in large cores (e.g. cores at least eleven inches deep).

It has also been observed that isocyanates, alone, are not effective core binders. We have observed that cores made with an isocyanate as the only binder have only marginal stripping strength and, in general, do not impart sufficient tensile strength to cores to make them useful for most industrial applications. Additionally, as the amount of isocyanate present in a foundry mix is increased, toxicity is generally believed to increase. Further, as the amount of isocyanate in a foundry mix is increased, there is an increasing tendency for castings to contain pin-holes. It is generally believed that this pin-holing is associated with the amount of nitrogen present in the binder. With our compositions, we can markedly reduce the toxicity problems associated with some of the isocyanates, per se, and have avoided, for the most part, problems of pin-holing.

The terms used herein are defined as follows:

"Drying oil" has been used in a generic sense to describe materials capable of reacting with oxygen of the air at room temperature (alone or with the aid of catalysts), in the presence of sand, to thereby harden the sand into a rigid mass. Thus, the term is meant to include natural drying oils (e.g., linseed oil), synthetic drying oils (e.g., dicyclopentadiene copolymers), etc.

"Foundry mix" refers to a mixture of an aggregate material such as sand and a binding amount of a polymerizable or curable binder, which mixture is used in the foundry art to prepare cores. Such a mix may optionally contain other ingredients such as iron oxide, ground flax fibers, wood cereal, pitch, and the like. The aggregate, e.g., sand, is usually the major constituent and the binder portion constitutes a relatively minor amount, generally less than 10%, frequently within the range of from about 0.25% to about 5%, these figures being based on the weight of sand. Most often, the binder content will range from about 1–3% by weight based on the weight of the sand. With our binder compositions, we have found that water can be tolerated in the foundry mix up to about 1 weight percent, based on the weight of the sand. However, we prefer that less than about 0.5 weight percent water, on the same basis, be present.

"Bench life" refers to the time interval existing between the time the foundry mix is prepared and the time when the mix can no longer be readily and effectively introduced into a pattern. This is often referred to as a loss of workability.

"Room temperature cure" is used to indicate a curing by chemical reaction without the need for external heating means. However, within the general description of "room temperature cure," there are a number of different room temperature curing mechanisms which can be employed. For example, "room temperature cure" encompasses both "air cure" and "no-bake." Normally, a room temperature cure is effected at temperatures of from about 60° F. to about 90° F. Binder systems possessing the ability to cure at room temperatures can also be cured at elevated temperatures, but they can be distinguished from the heat curable binders because of the ability of the former to cure without external heating.

As presently contemplated, the binder compositions of the present invention would preferably be used as a two-package system (i.e., part of the binder ingredients in one package and part of the binder ingredients in the other package). Thus, the binders of the present invention would ordinarily be sold, shipped, and stored as two separate packages. The first package of our composition is comprised of the drying oil, usually in the form of a solvent solution. The second package of our composition is comprised of a polyisocyanate (e.g., hexamethylene diisocyanate) or, somewhat less preferably, a polyisocyanate prepolymer (e.g., a prepolymer of toluene diisocyanate and ethylene glycol), ordinarily in the form of a solvent solution. At the time of use, the contents of the two packages would be combined (i.e., mixed together) to produce a composition having extremely advantageous properties as a room temperature curing binder for foundry cores (i.e., a no-bake binder). In this sense, our binder compositions can readily be distinguished from ordinary urethane modified resins as known in the coatings art. The latter involve the incorporation of small amounts of an isocyanate into a hydroxyl-containing resin at elevated temperatures as part of the original manufacturing process. These modified coating materials are frequently of a semi-gelled nature. Unlike the preparation of these coating materials, we keep our drying oil and isocyanate separate and then combine them, as part of the foundry process, at about the time a foundry mix is to be made. In this manner, the combination is capable of reacting in some manner, in the presence of the agregate (e.g., sand) to impart the stripping strength to cores that is needed. Moreover, we prefer to use generally more isocyanate than is ordinarily employed in the modified coating vehicles.

Catalysts are optionally and preferably employed so as to accelerate the rate at which stripping strength and ultimate tensile strength are obtained. These catalysts can be kept separate from our two-package system, and then mixed with the contents of the two packages at the time a foundry mix is prepared. Alternatively and preferably, we have found that the catalysts, solid or liquid, can be included in the first package (i.e., the package which contains the drying oil). Less preferably, they can be included in the second package. If the catalysts are placed in one of the packages, some skinning is usually observed in the affected package, much like the skinning observed at the top of an ordinary can of paint. This skinning can be overcome if conventional anti-skinning agents are included in the first package.

THE FIRST PACKAGE

Referring now to the first package, the drying oils which are useful in the present invention are those which are capable of air drying at room temperature, either alone or with the aid of driers. These drying oils include natural drying oils (ordinarily ethylenically unsaturated fatty tri-glycerides) such as linseed oil, tung oil, fish oils, soybean oil, safflower oil, and dehydrated castor oil, as well as the various known modifications thereof (e.g., the heat bodied, air-blown, or oxygen-blown oils such as blown linseed oil, blown soybean oil, etc., and modified vegetable oils such as soybean oil modified with maleic anhydride); synthetic drying oils containing ethylenic unsaturation such as the hydrocarbon polymers and copolymers prepared from butadiene, styrene, cyclopentadiene, and the like as is known in the art; alkyd resins such as the long-oil alkyds; esters of ethylenically unsaturated fatty acids such as the tall oil esters of glycerine or pentaerythritol; and the normally solid petroleum polymers of the type containing ethylenic unsaturation.

With respect to the latter, we have found that while these normally solid petroleum polymers may contain significant amounts of styrene, the aliphatic and alicyclic petroleum polymers having high iodine values are more preferred for foundry applications. Petroleum polymers containing cyclopentadiene or dicyclopentadiene are particularly desirable. We prefer to employ the normally solid petroleum polymers having a melting point above about 150° F. and preferably a melting point of at least 175° F. Petroleum polymers melting at from 180°–250° F. are especially preferred. Additionally, it is preferred that these petroleum polymers have an iodine value of at least 100, preferably an iodine value of at least 150, and more preferably, an iodine value of at least 200. Suitable petroleum polymers are available from such suppliers as the Velsicol Chemical Company.

The preferred drying oils for use in our invention are the alkyd resins, especially those of the unsaturated fatty oil-modified type. Drying oils, other than those just described, can also be used, provided they have the ability to air dry at room temperature, either alone or with the aid of driers. If desired, mixtures of drying oils can be employed.

We do not mean to imply that all drying oils having the ability to air dry at room temperature are equally effective in practicing the present invention. They are not. Thus, while one skilled in the foundry art can obtain some benefit from the teachings of the present invention by employing, for example, tung oil as the sole drying oil component, we have found that significant differences exist as the drying oil component is changed. By way of illustration, we have found that oil-modified alkyd resins are particularly outstanding for the foundry applications herein contemplated. Additionally, we have found the hydroxyl value of the alkyd resins is important. We have found that hydroxyl values of at least 25, and preferably of at least 50 are particularly desirable. An especially preferred range of hydroxyl values is from 60–130. Optimum results generally occur with oil-modified alkyd resins having a hydroxyl value of from 80–120. With some oil-modified alkyd resins, we have found that as the hydroxyl value is increased, the ultimate tensile strength of cores prepared therefrom is increased. However, we have further observed that the viscosity of these same oil-modified alkyd resins also increases as the hydroxyl value increases. While this increase in viscosity can be compensated, to some extent, by diluting the alkyd with additional solvent, we have found that a hydroxyl value of approximately 150 represents about the maximum value which can reasonably be employed for many ordinary applications, due to the difficulties encountered when mixing the resin with sand.

While the alkyd resins used in our invention can be prepared from a wide variety of ingredients as is known in the art, we prefer to employ alkyd resins which have been prepared from:

(a) Polyhydric alcohols having at least three hydroxyl groups, e.g. glycerol, pentaerythritol, trimethylol propane and the like. Pentaerythritol is preferred. Mixtures of polyhydric alcohols can be used.

(b) Polycarboxylic acids (or their anhydrides) such as maleic acid, fumaric acid, phthalic acid, phthalic anhydride, isophthalic acid; chlorendic acid and the like. The various phthalic acids (particularly isophthalic acid and phthalic anhydride) are preferred. Mixtures of acids can be used.

(c) Oil such as soybean oil, linseed oil, cottonseed oil, castor and dehydrated castor oils, tall oil, tung oil, fish oil and the like. Mixtures of oils can be used. Linseed oil is preferred. Particularly preferred are alkyd resins prepared from a mixture of linseed oil and castor oil wherein the mixture contains at least 25 weight percent linseed oil. More preferably, the mixture will contain from 50–95 weight percent linseed oil, e.g. from 60–90 weight percent linseed oil on the same basis. The remainder of the mixture will be castor oil.

We prefer to employ alkyd resins which are prepared from only the three classes of ingredients just listed. The more preferred resins will contain at least 40 weight percent oil (based on the weight of the resin formulation). More desirably, the alkyd resins will contain at least 50 weight percent oil on the same basis (i.e., a "long oil alkyd"). It should be pointed out that oil-modified alkyd resins can also be prepared (as is known in the resin art) from fatty acids rather than the corresponding oils or glycerides. As previously indicated, we have found that the type of oil used in making the oil-modified alkyds plays an extremely important role in the ultimate performance of our two-package binder compositions. While all of the common oil-modified alkyds can be employed, we have found that the performance of a linseed oil-modified alkyd resin of the type hereinbefore described is outstanding when compared to most other oil-modified alkyds. For example, a simple castor oil-modified alkyd, when used according to the teachings of the present invention, is capable of imparting good stripping strength to cores formed therefrom. However, the ultimate tensile strength which is obtained is not nearly as good as that obtained with a linseed oil-modified alkyd prepared in the same manner. Surprisingly, when an alkyd resin is prepared from a mixture of castor oil and linseed oil as previously described, the resulting oil-modified alkyd resin has more desirable properties than either of the corresponding oil-modified alkyd resins, per se. While not wishing to be bound to any theory, we are inclined to believe that there is a significant advantage involved in using, as a drying oil, an oil-modified alkyd resin having free hydroxyl groups on the fatty chains and further, in having ethylenic unsaturation present in fatty chains as opposed to, for example, modification of the alkyd with a vinyl monomer (e.g., styrene).

In an especially preferred embodiment, we prefer to use, as the drying oil in our first package, an oil modified alkyd resin in combination with a normally solid petroleum polymer of the type previously described. In this embodiment, the drying oil will ordinarily consist of from 40-90 weight percent, e.g., 50-80 weight percent, of the alkyd, with the remainder being the petroleum polymer.

As previously indicated, the first package is ordinarily employed as a solvent solution of the drying oil. However, various drying oils or combinations of drying oils can be used without solvents. Suitable solvents include ordinary mineral spirits, kerosene, and the like. The amount of solvent used can vary widely, although we prefer to keep the amount of solvent low, e.g., below 50% by weight, based on the total weight of the first package. Preferably, less than 35 weight percent solvent is used on the same basis. We prefer to keep the viscosity of the first package at less than Z-1 on the Gardner-Hold scale.

The first package may optionally include minor amounts, e.g., up to 5 weight percent, based on the weight of the drying oil, of monomeric alcohols such as methyl alcohol, ethyl alcohol, propyl alcohol, isopropyl alcohol, hexyl alcohol, ethylene glycol, pentaerythritol, trimethylolpropane, and the like. Preferably, saturated aliphatic polyhydric alcohols (e.g., ethylene glycol and pentaerythritol) are employed. Mixtures of alcohols can be used.

Where the drying oil employed contains free hydroxyl groups (such as are present in the preferred oil-modified alkyd resins), the use of a low molecular weight aliphatic alcohol is optional, although their use does offer some minor advantages. However, we have found significant advantages to including these low molecular weight alcohols, especially the polyhydric alcohols, containing at least three hydroxyl groups, in the first package when the drying oil employed contains little or no free hydroxyl groups. In this respect, we much prefer that the drying oil contain at least some free hydroxyl groups.

Small amounts of water, e.g., up to five weight percent, but preferably less than one weight percent, based on the weight of the drying oil, can be included in the first package to aid in cross-linking the isocyanate which is contained in the second package. The present system is compatible with up to one weight percent moisture in in the sand (based on the weight of the sand). Where small amounts of water are desired, we prefer that they be added directly to the sand and that water be substantially excluded from both packages of our two-package binder system.

If desired, other ingredients such as anti-skinning agents, anti-foaming agents, dyes, and the like can also be included in the first package.

THE SECOND PACKAGE

The second package of our composition is comprised of cyclic or aliphatic polyisocyanates having from 2-5 isocyanate groups. If desired, mixtures of polyisocyanates can be employed. Less preferably, isocyanate prepolymers formed by reacting excess polyisocyanate with a polyhydric alcohol (e.g., a prepolymer of toluene diisocyanate and ethylene glycol) can be employed. Suitable polyisocyanates include the aliphatic polyisocyanates such as hexamethylene diisocyanate; alicyclic polyisocyanates such as 4,4'-dicyclohexylmethane diisocyanate; and aromatic polyisocyanates such as 1,4- and 2,6-toluene diisocyanate; diphenyl methyl diisocyanate and the dimethyl derivative thereof. Further examples of suitable polyisocyanates are 1,5-naphthalene diisocyanate; triphenyl methane triisocyanate; xylylene diisocyanate and the methyl derivative; polymethylene polyphenyl isocyanate; chlorophenylene-2,4-diisocyanate, and the like. Again, we do not mean to imply that all polyisocyanates serve with the same effectiveness. They do not. While the aforementioned polyisocyanates are, to a greater or lesser degree, effective in practicing the present invention, we have found that there are significant advantages associated with the use of cyclic polyisocyanates, especially the aromatic polyisocyanates, as contrasted to the aliphatic polyisocyanates. We have found that aromatic polyisocyanates impart more rigidity to cores than do the aliphatic polyisocyanates. We prefer to use diphenylmethane diisocyanate, triphenylmethane triisocyanate, and mixtures thereof.

As previously indicated, the second package of our composition can (although it will not necessarily) contain a solvent. With the polyisocyanates, we have found that hydrocarbon solvents, particularly the aromatic hydrocarbon solvents (e.g., xylene) are especially useful. The choice of suitable solvent is a task well within the skill of the routineer. Again, we prefer that less than 50% by weight of the second package be solvent. Preferably, less than 35 weight percent of the second package is solvent.

If desired, other ingredients can also be included in the second package, e.g., anti-foaming agents, dyes and the like.

CATALYSTS

As previously indicated, we have found it preferable (although not generally necessary) to employ a catalyst in conjunction with our two-package binder system. The catalyst, or combination of catalysts, can be kept separate until use or it can be included in one of the packages, e.g., in the first package. The catalysts employed are those which accelerate the air drying of the drying oil, those which accelerate the polyisocyanate cure, and those which do both. The amount of catalyst employed will be a catalytic amount, with the total amount of catalyst(s) usually ranging from 0.01-20%, based on the weight of the binder. More frequently, from 0.1-15%, e.g., 0.25-10% catalyst will be used, based on the weight of the binder (i.e., based on the total weight of the two packages). The choice of catalyst and the amount thereof will affect the curing rate of the binder composition when the contents of the two packages are combined. Metal naphthenates (e.g., cobalt naphthenate) are effective catalysts for both the isocyanate reaction and the air drying reaction of the drying oil, the latter being their primary function. Sodium perborate is also useful in promoting the oxygen cross-linking of the drying oil, although its use is not particularly preferred. Dibutyl tin dilaurate is an effective catalyst for promoting the urethane or isocyanate reaction. We offer these catalysts as exemplary of those which can be employed in our invention. However, other known driers can be used to promote the air drying feature of the present invention. Additionally, other known urethane catalysts can be used to promote the curing of the isocyanate portion of our compositions. We prefer to use cobalt naphthenate, alone, or in combination with dibutyl tin dilaurate.

GENERAL CONSIDERATIONS

When combining all of the binder ingredients of the present invention, we have found that, in general, as much or more drying oil should be employed as polyisocyanate, on a non-volatile (i.e., solids) weight basis. Consequently, when the two packages are combined, the weight of the polyisocyanate will ordinarily be less, on a non-volatile basis, than the weight of the drying oil (e.g., less than the combined weight of alkyd and petroleum polymer). Thus, the polyisocyanate will account for less than 50% of the combined weight of drying oil and polyisocyanate (thereby excluding any consideration of the weight of solvent). We prefer to use from 10-50 weight percent polyisocyanate based on the weight of drying oil. More frequently, we use from 15-40 weight percent, e.g., from 20-30 weight percent polyisocyanate on the same basis.

In this respect, we have found it to be particularly advantageous to employ an amount of polyisocyanate which is sufficient to react with all of the hydroxyl groups available in the first package. Even more preferably, we employ up to 50% excess polyisocyanate, e.g. from 2-15% excess polyisocyanate based on the amount needed to react with all of the free hydroxyl groups in the first package. Presumably, this excess polyisocyanate reacts with moisture present in the sand. Additionally, with respect to cores, we have noted that the stripping strength attained in a fixed period of time generally increases as the amount of polyisocyanate included in the binder is increased. At the same time, we have observed no significant change in the ultimate tensile strength.

Obviously, the amount of solvent employed in each package can be varied over wide ranges and, accordingly the apparent amount of each of the two packages used can vary over a comparably wide range.

In the ordinary use of our composition to prepare foundry cores, our invention then comprises the following steps, (1) forming a foundry mix containing an aggregate (e.g., sand) and the contents of the first and second packages; (2) introducing the foundry mix into a mold or pattern to thereby obtain a green core; (3) allowing the green core to remain in the mold or pattern for a time at least sufficient for the core to attain a minimum stripping strength (i.e., become self-supporting); and (4) thereafter removing the green core from the mold or pattern and allowing it to air dry at room temperature, thereby obtaining a hard, solid, cured core. Optionally, the green cores of the present invention can be stripped from the mold or pattern and baked to accelerate the cure. As previously indicated, catalysts can be and frequently are used to accelerate the rate of cure and these catalysts can be included in the first or second packages, or added separately at the time the foundry mix is prepared.

While we prefer to manufacture and use our compositions as a two-package system, this is not an absolute requirement. For example, the ingredients needed to prepare a foundry mix (e.g., petroleum polymer, alkyd resin, polyisocyanate, solvent, catalyst and, for example, sand) can be kept separate (not prepared into two distinct packages) and then all combined at once at the time it is desired to prepare the foundry mix.

It should also be noted that the binder compositions of the present invention can be used (less preferably) in combination with other known binder compositions.

The present invention will be more clearly understood by reference to the following runs which include a preferred embodiment of the present invention. Unless otherwise indicated, all parts are by weight and all percentages are weight percentages.

In the following runs, a wooden pattern box was employed which had internal dimensions of 4" x 4" x 18". One 4" x 4" end of the box was open, the remaining five sides being closed. Acceptable stripping strength, in this instance, was defined as that strength necessary to enable a 4" x 4" x 18" core to be removed from the pattern box and then stood on its wet end (the unexposed 4" x 4" end) without sagging or losing its shape. This requirement was necessary so that the pattern box could be freed for further use and so that the five sides or surfaces of the test core which had not previously been exposed to the air, could be exposed to the air and the core thereby cured at room temperature. Incidentally, the ratio of bench life to the time required for a core to reach an acceptable level of stripping strength is a significant parameter. Values below 1:5 are desirable, e.g., a ratio below 1:3 is very desirable. We have observed that the ability of cores this size to consistently perform this "no sag" test successfully requires a green sand strength of above 70, as measured according to the standard AFS green sand mold hardness test. This test employs a ball penetrometer and gives scale readings of from 0 to 100, 100 being the hardest and 0 being the softest. We do not mean to imply that all cores having a hardness of less than 70 will sag. Rather, we mean that when the hardness is above 70, no sag has been observed. We have prepared some cores of this size having a green hardness lower than 70 which did not sag, although this was not the ordinary situation. The hardness profile of the core obviously plays a role here.

Runs 1–3 which follow, illustrate the use of a drying oil, alone, as a core binder; the use of an isocyanate, alone, as a core binder; and the combined use of an isocyanate and a drying oil as a core binder.

Run 1

This run illustrates the preparation of a core using a drying oil, alone, as a core binder. In this run, 10,000 parts of sand (Michigan Lake sand; AFS #55), 150 parts of an oil-modified alkyd resin having a hydroxyl number of about 105 (64.5% linseed oil, 14.4% pentaerythritol, and 21% isophthalic acid), 50 parts of xylene, 10 parts of one catalyst (sodium perborate), and 7.5 parts of another catalyst (6% cobalt naphthenate solution; Nuodex; 65% non-volatile in mineral spirits) were intimately mixed. The resulting foundry sand mix was then introduced into the wooden pattern previously described. The results obtained are summarized in Table I, infra.

Run 2

A foundry sand mix was prepared by intimately mixing 10,000 parts of sand (Michigan Lake sand; AFS #55), 150 parts of a mixture of crude di- and tri-phenylmethane, di- and tri-isocyanate (Mondur MR), 50 parts of xylene, 10 parts of one catalyst (sodium perborate) and 7.5 parts of another catalyst (a 6% cobalt naphthenate solution). This foundry sand mix was then introduced into the wooden pattern previously described. The results obtained by using this foundry sand mix are also described in Table I, infra.

Run 3

A foundry sand mix was prepared by intimately mixing 10,000 parts of sand (Michigan Lake sand; AFS #55), 108 parts of drying oil (the same as in Run 1), 50 parts of xylene, 42 parts of polyisocyanate (the same as in Run 2), 10 parts of one catalyst (sodium perborate) and 7.5 parts of another catalyst (a 6% solution of cobalt naphthenate). This foundry sand mix was then introduced into the wooden pattern previously described. The results obtained by using this inventive foundry sand mix are also given in Table I, which follows.

TABLE I

| Run No. | 1 | 2 | 3 |
|---|---|---|---|
| Bench Life, mins | 40–45 | (¹) | 5 |
| Time in Pattern Box Before Stripping, hours | 2 | 4 | 1 |
| AFS Green Hardness of Core at Time of Stripping: | | | |
|   Top (open end) | 75–90 | 82 | 90–95 |
|   Middle | 0 | 75 | 92–95 |
|   Bottom (closed end) | 0 | 65 | 92–95 |
| AFS Tensile Strength ² (p.s.i.): | | | |
|   1 hour | <30 | <30 | 64 |
|   2 hours | 42 | <30 | ------ |
|   3 hours | ------ | <30 | 171 |
|   4 hours | 73 | <30 | 173 |
|   Overnight | ------ | 34 | ------ |

¹ Indefinite.
² Run on standard specimens and not on the core, per se.

From the data presented in Table I, it can be seen that the core prepared from the combination of polyisocyanate and drying oil (Run 3) possessed properties which were extremely advantageous and particularly outstanding when compared with the properties of cores prepared from the drying oil, alone (Run 1), or the polyisocyanate, alone (Run 2). For example, the inventive binder composition (Run 3) imparted a very high stripping strength to the core after remaining in the pattern box for only one hour. As previously pointed out, no sag is observed after the hardness reaches 70 and so the core could have been removed in less than one hour and still have been self-supporting. Additionally, the time required to attain a usable tensile strength (ordinarily considered to be about 100 minimum) was considerably shorter than that exhibited by the binders of Run 1 or 2. The core made from the drying oil, alone (Run 1), was allowed to remain in the pattern box for 2 hours before stripping. At that time, a significant amount of curing had occurred at the exposed or open end of the pattern box. However, the hardness at the middle of the core and at the bottom of the core (the closed end) were wholly unsatisfactory. Obviously, a core having these strength characteristics was not self-supporting and could not be stood on end to air dry without sagging or falling apart. In a like manner, the core prepared from the polyisocyanate, alone, was slow in attaining any degree of stripping strength. It can be observed that the core thus prepared was allowed to remain in the pattern box for 4 hours, and even at that time had not come up to the hardness achieved by the core made with the drying oil/polyisocyanate combination of the present invention after only 1 hour. Additionally, and of considerable importance, is the fact that the ultimate tensile strength obtained by using polyisocyanate, alone, never reached an acceptable level during the test period, i.e., it only achieved a tensile strength of 34 p.s.i. after air drying overnight at room temperature, as contrasted with the tensile strength of 171 which was obtained in 3 hours at room temperature using the drying oil/polyisocyanate combination of the present invention.

*Runs 4, 5 and 6*

Runs 4, 5 and 6 illustrate preferred binder compositions of the present invention, as well as preferred foundry sand mixes. One of the purposes of these runs is to demonstrate the advantages obtained by using an oil-modified alkyd resin having a higher hydroxyl value. In these runs, as the hydroxyl value of the alkyds was increased, the amount of polyisocyanate employed was also increased to maintain a level of polyisocyanate in excess of that theoretically required to react with all of the free hydroxyl groups in the alkyd. The foundry sand mixes of Runs 4, 5 and 6 each contained 10,000 parts of sand (Michigan Lake sand), 120 parts of oil-modified alkyd resin (all prepared from the same fatty glyceride oil [i.e., linseed oil], the same polyhydric alcohol, and the same polycarboxylic acid), 80 parts of a solution of normally solid ethylenically unsaturated petroleum polymer (a 70% solids solution having an iodine value of approximately 175, as is), and 24 parts of catalyst (10 parts of sodium perborate, 13.8 parts of a 6% cobalt naphthenate solution, and 0.2 part of dibutyl tin dilaurate, the latter being a product of Union Carbide Corporation identified as D-22). In addition, Run 4 contained 20.4 parts of crude di- and tri-phenylmethane, di- and tri-isocyanate (Mondur MR); Run 5 contained 24 parts of this same material; and Run 6 contained 37 parts of this material. The data relating to these foundry sand mixes are presented in Table II, which follows.

TABLE II

| Run No | 4 | 5 | 6 |
|---|---|---|---|
| Hydroxyl Number of the Alkyd | 69.3 | 91.7 | 100.5 |
| Bench Life, mins | 25-30 | 25-30 | 30-35 |
| Time in Pattern Box Before Stripping, hour | 1 | 1 | 1 |
| AFS Green Hardness of Core at Time of Stripping: | | | |
| Top (open end) | 95 | 95 | 92 |
| Middle | 85 | 85 | 88 |
| Bottom (closed end) | 80-90 | 80-85 | 85 |
| AFS Tensile Strength (p.s.i.): | | | |
| 2 hours | 82 | 84 | 132 |
| 3 hours | 102 | 110 | 180 |
| 4 hours | 123 | 141 | 232 |
| Overnight | 270 | 277 | 319 |

From the data appearing in Table II, it can be seen that increasing the hydroxyl value of the resin, while increasing the amount of polyisocyanate employed, results in the more rapid formation of high tensile strength cores. In all cases, the time that the core was left in the pattern box was sufficient to harden the cores to a point well beyond that required to pass the "no sag" test.

*Runs 7 and 8*

These two runs demonstrate the effect of changing the hydroxyl value of a long-oil alkyd (i.e., a drying oil) while using a constant amount of polyisocyanate and drying oil. The foundry mixes of each of these runs (i.e., Runs 7 and 8) contained 10,000 parts of finely divided foundry aggregate (i.e., sand), 131 parts of drying oil (i.e., long-oil alkyd), 30 parts of a mixture of di- and tri-phenylmethane, di- and tri-isocyanate (Mondur MR), 39 parts of solvent, 3.75 parts of cobalt napthenate solution (6% cobalt metal) and 0.22 part of dibutyl tin dilaurate. The long-oil alkyd of Run 7 had the following formulation: 66.3% linseed oil; 12.3% pentaerythritol; and 21.4% isophthalic acid. The long-oil alkyd of Run 8 had the following formulation: 65% linseed oil; 14% pentaerythritol; and 21% isophthalic acid. The results obtained with these foundry sand mixes are shown in Table III, which follows.

TABLE III

| Run No | 7 | 8 |
|---|---|---|
| Hydroxyl Number of the Alkyd (calc.) | 70.7 | 91.7 |
| Time in Pattern Box Before Stripping, hour | 1 | 1 |
| AFS Green Hardness of Core at Time of Stripping: | | |
| Top (open end) | 95 | 94 |
| Middle | 90-92 | 92 |
| Bottom (closed end) | 90-95 | 90 |
| AFS Tensile Strength (p.s.i.) | | |
| 2 hours | 98 | 112 |
| 3 hours | 122 | 160 |
| Overnight | 206 | 280 |

From the data appearing in Table III, it can be seen that increasing the hydroxyl value of the alkyd, while maintaining the amount of alkyd and drying oil constant, results in the more rapid formation of high tensile strength cores. In both Runs 7 and 8, the time that the core was left in the pattern box was sufficient to harden the cores to a point well beyond that required to pass the "no sag" test.

*Runs 9, 10, and 11*

Runs 9-11 illustrate the effect of increasing the amount of polyisocyanate while maintaining all other conditions identical. The foundry sand mixes prepared in Runs 9-11 each contained 10,000 parts of sand, 120 parts of drying oil (the same as used in Run 4), 80 parts of a petroleum polymer (the same as used in Run 4), and 24 parts of catalyst (10 parts of sodium perborate, 13.8 parts of a standard 6% solution of cobalt naphthenate, and 0.2 part of dibutyl tin dilaurate; the latter being identified as D-22). In Run 9, 14 parts of aromatic polyisocyanate were employed (Mondur MR). In Run 10, 17.2 parts of aromatic polyisocyanate were employed (Mondur MR). In Run 11, 20 parts of aromatic polyisocyanate were employed (Mondur MR). The results obtained by using these foundry sand mixes are presented in Table IV, which follows.

TABLE IV

| Run No | 9 | 10 | 11 |
|---|---|---|---|
| Bench Life, mins | 25-30 | 25-30 | 25-30 |
| Time in Pattern Box Before Stripping, hour | 1 | 1 | 1 |
| AFS Green Hardness of Core at Time of Stripping: | | | |
| Top (open end) | 95 | 95 | 85 |
| Middle | 50 | 65 | 80 |
| Bottom (closed end) | 55 | 75 | 70 |
| AFS Tensile Strength (p.s.i.): | | | |
| 1 hour | 30 | 33 | 46 |
| 2 hours | 71 | 75 | 76 |
| 3 hours | | 106 | 114 |
| 4 hours | 129 | 125 | |
| Overnight | 252 | 246 | 271 |

The data in Table IV clearly demonstrate how the rate at which stripping strength is obtained is enhanced by using more polyisocyanate. At the same time, there is no adverse effect on the ultimate tensile strength. It should also be noted that cores formed from the foundry sand mixes of Runs 9 and 10 are quite good if they are left in the pattern box for more than one hour (e.g. two hours) before stripping.

Results similar to those obtained in Runs 9–11 have also been obtained using polymethylene polyphenyl isocyanate (i.e. PAPI, a product of Carwin Chemical Company).

Runs 12–14

In Runs 12–14, one of the more preferred binder compositions of the present invention was employed. In these runs, the only variable was the amount of catalyst used. In each of these runs, a foundry sand mix was prepared by intimately mixing 10,000 parts of sand, 75 parts of a drying oil (the same as used in Run 1), 46.4 parts of ethylenically unsaturated petroleum polymer (100% solids, an iodine value of 215, and a melting point of about 200° F.), 38.4 parts of mineral spirits, 30 parts of aromatic polyisocyanate (Mondur MR), 10 parts of xylene, and 3.75 parts of a standard 6% solution of cobalt naphthenate (Nuodex). In Run 12, no additional urethane catalyst was employed. In Run 13, 0.16 part of additional urethane catalyst were employed (dibutyl tin dilaurate; identified as D-22). In Run 14, 0.32 part of additional urethane catalyst were employed (dibutyl tin dilaurate; identified as D-22). The results obtained with these foundry sand mixes are presented in Table V, which follows.

TABLE V

| Run No | 12 | 13 | 14 |
|---|---|---|---|
| Bench Life, mins | 45–50 | 40–45 | 35–40 |
| Time in Pattern Box Before Stripping, hrs | 1½ | 1¼ | 1 |
| AFS Green Hardness of Core at Time of Stripping: | | | |
| Top (open end) | 88–92 | 88–90 | 88–90 |
| Middle | 80–82 | 80–85 | 80–88 |
| Bottom (closed end) | 80–82 | 80–85 | 82–86 |
| AFS Tensile Strength (p.s.i.), 3 hours | 102 | 118 | 102 |

From the data presented in Table V, it can be seen how increasing the level of urethane catalyst shortens the time required for adequate stripping strength to be developed.

One very effective petroleum polymer for use in practicing the present invention, especially when used in conjunction with an alkyd resin, is a petroleum polymer sold commercially as GD-5-28 by the Velsicol Chemical Co. This polymer has a melting point (ball and ring) of about 200°–220° F. a minimum iodine value of 200, and a molecular weight of from 800–1700.

As further illustrative of the various ways in which the binder compositions of our invention can be employed, reference is again made to Runs 12–14, just described. The binder ingredients described therein can be divided in the following preferred manner:

Package A:
 (1) The alkyd resin.
 (2) The petroleum polymer.
 (3) The solvent (mineral spirits).
Package B:
 (1) The polyisocyanate (Mondur MR).
 (2) The solvent (xylene).

The catalyst(s) can be included in one of the packages, as previously indicated, or the catalyst(s) can be kept separate and combined with the contents of package A and package B at the time a foundry mix is made. Also, we have obtained good results by first mixing the catalyst with the aggregate (e.g., sand), and then combining the contents of packages A and B with the sand/catalyst mixture. We prefer to include the catalyst in package A.

Runs 15 and 16

Runs 15 and 16 are further illustrative of the advantages to be obtained by preparing cores according to the present invention. These two runs show how essential the isocyanate component is.

In Run 15, an inventive foundry sand mix was prepared by itimately mixing 10,000 parts of sand, 81.5 parts of an oil-modified alkyd (the same as used in Run 1), 50.3 parts of petroleum polymer, 41.6 parts of mineral spirits, 20 parts of aromatic polyisocyanate (Mondur MR), 6.7 parts of xylene, 3.75 parts of a standard solution of cobalt naphthenate (6% cobalt metal), and 0.32 parts of a urethane catalyst (dibutyl tin dilaurate; identified as D-22). The data obtained by using this foundry sand mix are presented in Table VI, infra.

In Run 16, a non-inventive foundry sand mix was prepared by intimately mixing 10,000 parts of sand, 94 parts of an alkyd resin (the same as used in Run 1), 58 parts of a petroleum polymer (the same as used in Runs 12–14), 48 parts of mineral spirits, 3.75 parts of a standard solution of cobalt naphthenate (6% cobalt metal), and 0.32 part of a urethane catalyst (dibutyl tin dilaurate; identified as D-22). The results obtained using this non-inventive foundry sand mix (no polyisocyanate present) are shown in Table VI, which follows.

TABLE VI

| Run No | 15 | 16 |
|---|---|---|
| Bench Life, mins | 45–50 | >60 |
| Time in Pattern Box Before Stripping, hrs | 1 | >3 |
| AFS Green Hardness of Core at Time of Stripping: | | |
| Top (open end) | 90 | core |
| Middle | 75–78 | fell |
| Bottom (closed end) | 65–70 | apart |
| AFS Tensile Strength (p.s.i.), 3 hours | 108 | 36 |

Run 17

A non-inventive foundry sand mix was prepared by intimately mixing 10,000 parts of sand, 152 parts of a non-drying oil (castor oil having an iodine value of 81–91), 48 parts of a crude mixture of di- and tri-phenylmethane, di- and tri-isocyanate (Mondur MR), and 17.5 parts of catalyst (10 parts of sodium perborate and 7.5 parts of a standard solution of cobalt naphthenate). This foundry sand mix had a bench life of approximately 120 minutes. After being left in the pattern box for 4 hours, the core hardness, as measured in the standard AFS test, ranged from 93 to 95 at the top of the core to a value of about 90 at the bottom of the core. Thus, the simple combination of this non-drying oil with poly-isocyanate does give increased stripping strength. However, the tensile strength after 4 hours was only 36 p.s.i., which is far below the minimum acceptable level.

From this run (17), it can be appreciated that non-drying oils, when used alone, do not give results which are acceptable to the foundry industry for use as a "no-bake" binder. We do not mean to imply that non-drying oils cannot be used in combination with and as supplements to our preferred binder compositions. Materials such as castor oil, which has a reasonable degree of unsaturation (e.g., an iodine value of more than 50), can be used in minor amounts in combination with our binders. Additionally, it should be pointed out that castor oil can be dehydrated to increase its iodine value to above 130, e.g., to 140–145. Dehydrated castor oil is considered to be a drying oil by those skilled in the art.

In this respect, we prefer that the natural drying oils (e.g. tung oil) used in our invention have an iodine value of at least 100, preferably at least 115, and more preferably, at least 130. With respect to the hydrocarbon or petroleum polymers, we prefer that they also have an iodine value of at least 100. Because of the difference in chemical structure existing between the unsaturated fatty triglycerides (e.g., linseed oil) and the synthetic drying oils of the modified or unmodified hydrocarbon polymer-type, we prefer that the latter have an even higher iodine value of at least 100. Because of the differences e.g., 250. By way of illustration, various butadiene/styrene copolymers (and modifications thereof) are commercially available from Enjay Chemical Company under the trademark "Buton," e.g., Buton 100, Buton 200, and Buton 300. These polymers have iodine values ranging from about 210–330 and hydroxyl values ranging from 0–150. In the absence of catalysts, they air dry slowly. However, with lead, cobalt or manganese naphthenate catalysts, they can be air dried.

*Run 18*

This run illustrates the use of a polyhydroxy ester. In this run, a foundry sand mix was prepared by intimately mixing 10,000 parts of sand, 75 parts of polyhydroxy ester having a hydroxyl value of about 228, 50 parts of an aromatic polyisocyanate (a mixture of di- and tri-phenylmethane, di- and tri-isocyanate; Mondur MR), 35 parts of petroleum polymer (Velsicol GD–5–28; 100% solids, an iodine value of 215, and a melting point of about 200° F.), 22.5 parts of xylene, and 17.5 parts of catalyst (10 parts of sodium perborate and 7.5 parts of a standard solution of cobalt naphthenate). The hydroxyl-containing ester was prepared from a mixture of 84.2 parts of linseed oil and 15.8 parts of pentaerythritol. Some material crystallized out during the ester preparation and it was filtered off. While the exact composition of the ester was unknown, it had a hydroxyl number of 227.9. The data pertaining to Run 18 appears in Table VII, which follows.

TABLE VII

Run No. 18:
  Bench Life, mins _____ 35–40
  Time in Pattern Box Before Stripping, hrs ___ 2
  AFS Green Hardness of Core at Time of Stripping:
    Top (open end) _____ 95
    Middle _____ 80–85
    Bottom (closed end) _____ 75–80
  AFS Tensile Strength (p.s.i.):
    2 hours _____ 103
    4 hours _____ 175
    Overnight _____ 257

From the data contained in Table VII, it can be seen that this fatty polyhydroxy ester, when used in our combination, was capable of providing excellent results.

For some reason, presently unknown to us, we have found significant advantages associated with the use of drying oils (in the broad sense) in which at least some of the individual molecules contain both free hydroxyl groups and ethylenic unsaturation, the latter being present in fatty chains, i.e., in $C_8$–$C_{26}$, e.g., $C_{12}$–$C_{24}$ fatty chains. Moreover, we have observed that urethane-type coating materials are generally unsuited for use as foundry binders. These observations are illustrated by the next run (i.e. Run 19).

*Run 19*

This run was made by using, as the core binder, the composition described in Example 8 of U.S. Patent 3,007,894. Here, 10,000 parts of sand were intimately mixed with 88.9 parts of resin, 111.1 parts of isocyanate prepolymer, and 0.7 parts of benzoyl peroxide. The resin had the following formulations: 24.4% trimethylol propane, 6.5% diethylene glycol, 17.1% linseed fatty acid, 27% phthalic anhydride and 25% styrene. The prepolymer had the following formulation: 47.7% toluene di-isocyanate, 40% styrene, 8.7% trimethylol propane, 3.6% butylene glycol and 0.05% quinone.

The resulting foundry mix had a bench life of more than one hour. When an attempt was made to remove the green core from the pattern box in two hours, the core fell apart. Tensile strength of specimens aged overnight was only 60 p.s.i.

From these results, it can be seen that this material was wholly unsuitable for use as a "no-bake" binder. It is interesting to note that both the resin and prepolymer contained significant amounts of a vinyl monomer. In contradistinction, we prefer to exclude vinyl monomers (e.g., styrene) completely from our preferred alkyd resin compositions.

*Runs 20–21*

Runs 20–21 illustrate the optimal use of polyols.

The procedure employed in Runs 20–21 was as follows: A foundry sand mix was prepared by intimately mixing 10,000 parts of sand, 73.25 parts of drying oil (the same as used in Run 1), 1.75 parts of polyol, 28.9 parts of aromatic polyisocyanate (Mondur MR), 46.1 parts of petroleum polymer (the same as used in Runs 12–14), 50 parts of xylene, and 7.5 parts of catalyst (a standard solution of cobalt naphthenate).

In Run 20, the polyol was glycerol. This run additionally included 0.16 parts of a urethane catalyst (dibutyl tin dilaurate; identified as D–22).

In Run 21, the polyol was ethylene glycol.

The results obtained by using the foundry sand mixes of Runs 20–21 are presented in Table VIII, which follows.

TABLE VIII

| Run No. | 20 | 21 |
|---|---|---|
| Bench Life, mins | 20–30 | 15–20 |
| Time in Pattern Box Before Stripping, hr | 1 | 1 |
| AFS Green Hardness of Core at Time of Stripping: | | |
| Top (open end) | 90–93 | 90–95 |
| Middle | 88–90 | 85–90 |
| Bottom (closed end) | 85–90 | 80–85 |
| AFS Tensile Strength (p.s.i.): | | |
| 1 hour | 34 | 62 |
| 2 hours | 90 | 114 |
| 3 hours | 121 | 120 |
| 4 hours | 136 | 130 |
| Overnight | 141 | 140 |

*Run 22*

A foundry sand mix was prepared by intimately mixing 10,000 parts of sand, 75 parts of long-oil alkyd, 46.1 parts of petroleum polymer (Velsicol GD–5–28), 17.5 parts of mineral spirits, 29.9 parts of aromatic polyisocyanate (Mondur MR), 25 parts of xylene, 7.5 parts of a standard cobalt naphthenate solution, and 0.16 parts of dibutyl tin dilaurate (D–22). The long-oil alkyd had the following formulation: 64.5% linseed oil, 14.4% pentaerythritol, and 21% phthalic acids (a 65/35 mixture of isophthalic acid and terephthalic acid). The results obtained with this foundry sand mix are shown in Table IX, which follows.

TABLE IX

Run No. 22:
  Bench Life, min. _____ 25–30
  Time in Pattern Box
    Before Stripping, hr. _____ 1
  AFS Green Hardness of Core at Time of Stripping:
    Top (open end) _____ 85–90
    Middle _____ 76–78
    Bottom (closed end) _____ 85–88
  AFS Tensile Strength (p.s.i.):
    2 hours _____ 106
    4 hours _____ 169
    Overnight _____ 183

*Run 23*

A foundry sand mix was prepared by intimately mixing 10,000 parts of sand, 75 parts of long-oil alkyd (64.5% castor oil, 14.4% pentaerythritol and 21% isophthalic acid), 7.5 parts of a standard cobalt naphthenate solution (Nuodex), 17.5 parts of mineral spirits, 20.9 parts of aromatic polyisocyanate (Mondur MR), 46.1 parts of petroleum polymer (Velsicol GD-5-28), 25 parts of xylene, and 0.32 part of dibutyl tin dilaurate (D-22).

This foundry sand mix had a bench life of 10-12 minutes. When the core was stripped after 45 minutes, it had a green hardness of 92-85 (top to bottom). However, the air drying ability of this material was not nearly as good as the linseed oil alkyds, the latter being unique among the oil-modified alkyds in their outstanding performance.

*Runs 24 and 25*

These runs were made by intimately mixing 10,000 parts of sand, 75.2 parts of long-oil alkyd (64.5% oil, 14.4% pentaerythritol and 21% isophthalic acid), 46.4 parts of petroleum polymer (Velsicol GD-5-28) having an iodine value of at least 200 and a melting point of about 220° F., 38.4 parts of mineral spirits, 30 parts of aromatic polyisocyanate (Mondur MR), 10 parts of xylene, 3.75 parts of a standard cobalt naphthenate solution (Nuodex), and 0.16 part of dibutyl tin dilaurate (D-22).

In Run 24, the oil used in the alkyd was a mixture of oils consisting of 50% linseed oil and 50% castor oil.

In Run 25, the oil used in the alkyd was a mixture of oils consisting of 75% linseed oil and 25% castor oil.

The resulting data are shown in Table X, which follows.

TABLE X

| Run No. | 24 | 25 |
|---|---|---|
| Bench Life, mins | 15-20 | 15-20 |
| Time in Pattern Box Before Stripping, hrs | 1 | 1¼ |
| AFS Green Hardness of Core at Time of Stripping: | | |
| Top (open end) | 92-95 | 92-95 |
| Middle | 90-92 | 92 |
| Bottom (closed end) | 90-92 | 92 |
| AFS Tensile Strength (p.s.i.): | | |
| 1 hour | 25 | 43 |
| 3 hours | 85 | 100 |
| Overnight | 167 | 255 |

From the data in Table X, it can be seen that the presence of castor oil, as a modifier for the alkyd, aids in the rapid attainment of a high level of stripping strength. At the same time, it can be noted that Run 25, containing less castor oil than Run 24, achieved a much higher tensile strength than did Run 24. Run 25 is a preferred embodiment of our invention.

Having described the present invention with a certain degree of particularity, it will be realized that numerous minor changes and variations, falling within the spirit and scope of this invention, will become obvious to those skilled in the art. It is not intended that this invention be limited to any of the materials which have been mentioned as specific examples, nor by the specific proportions which have been given for the sake of illustration, but it is intended to claim all novelty inherent in the invention, as well as all obvious modifications and variations thereof.

What is claimed is:

1. The foundry process which comprises mixing foundry sand with a binding amount of up to 10% by weight based on said sand of a no-bake binder to thereby form a foundry mix, said no-bake binder consisting essentially of:
   (a) as a first part, drying oil selected from the group consisting of synthetic drying oils, oil-modified alkyd resins, polyhydric alcohol esters of ethylenically unsaturated fatty acid, ethylenically unsaturated petroleum polymers, and mixtures thereof; and
   (b) as a second part, polyisocyanate; from 10-50 weight percent polyisocyanate being present based on the weight of drying oil.

2. The foundry process of claim 1 wherein said drying oil comprises oil-modified alkyd resin having a hydroxyl value of at least 25 and wherein said polyisocyanate is aromatic polyisocyanate.

3. The foundry process of claim 1 wherein:
   (a) said alkyd resin is a linseed oil modified alkyd resin containing at least 40 weight percent linseed oil based on the formulation weight of said alkyd; and
   (b) wherein said aromatic polyisocyanate comprises diphenyl methane di-isocyanate.

4. The foundry process of claim 2 wherein:
   (a) said drying oil also comprises ethylenically unsaturated petroleum polymer, said drying oil consisting of 40-90 weight percent of said alkyd resin with the remainder being the petroleum polymer; and
   (b) wherein said aromatic polyisocyanate comprises diphenyl methane di-isocyanate.

5. The foundry process of claim 2 wherein a catalytic amount of catalyst is also mixed with said foundry sand, said catalyst comprising cobalt naphthenate and di-butyl tin di-laurate.

6. The foundry process of claim 1 wherein a catalytic amount of metal naphthenate catalyst is also mixed with said foundry sand.

7. The process of claim 1 which further includes the steps of shaping and curing said foundry mix to thereby form a core.

8. The process of claim 1 which further includes the steps of:
   (a) mixing a catalytic amount of catalyst with said foundry sand; and
   (b) shaping and curing said foundry mix to thereby form a core; said catalyst being selected from the group consisting of catalysts which accelerate the air drying of the drying oil, catalysts which accelerate the polyisocyanate cure, and catalysts which do both.

9. The process of claim 8 wherein said drying oil comprises oil-modified alkyd resin having a hydroxyl value of at least 25 and wherein said polyisocyanate is aromatic polyisocyanate.

10. The process of claim 9 wherein:
    (a) said alkyd resin is a linseed oil modified alkyd resin containing at least 40 weight percent linseed oil based on the formulation weight of said alkyd; and
    (b) wherein said aromatic polyisocyanate comprises diphenyl methane di-isocyanate.

11. A workable foundry mix consisting essentially of sand intimately mixed with drying oil and polyisocyanate; said drying oil comprising alkyd resin formulated from linseed oil, castor oil, pentaerythritol, and a phthalic acid, the total weight of linseed oil and castor oil being at least 50 weight percent of the formulation weight of said resin; the weight of said linseed oil amounting to from 60 to 90 weight percent of the total weight of linseed oil and castor oil; said resin having a hydroxyl value of from 60 to 130; and said polyisocyanate comprising diphenyl methane di-isocyanate; the total weight of drying oil and polyisocyanate being a binding amount up to 10% by weight based on the weight of the sand, and the weight of polyisocyanate being from 10-50% of the weight of drying oil.

12. A cured foundry core consisting essentially of sand and a binding amount of from 0.25 to 5% by weight based on the weight of said sand of a binder composition; before curing, said binder composition consisting essentially of:
    (a) drying oil comprising oil-modified alkyd resin having a hydroxyl value of at least 25 and containing at least 40 weight percent oil based on the formulation weight of said alkyd;
    (b) aromatic polyisocyanate comprising diphenyl methane di-isocyanate; and
    (c) a catalytic amount of cobalt naphthenate catalyst; from 10-50 weight percent polyisocyanate being present based on the weight of drying oil.

13. A foundry mix containing sand as the major constituent and a binding amount of up to 10% by weight based on the weight of sand of a no-bake foundry binder composition, said foundry binder composition consisting essentially of:
   (a) as a first part, drying oil selected from the group consisting of synthetic drying oils, oil-modified alkyd resins, polyhydric alcohol esters of ethylenically unsaturated fatty acid, ethylenically unsaturated petroleum polymers, and mixtures thereof; and
   (b) as a second part, polyisocyanate; from 10 to 50 weight percent polyisocyanate being present based on the weight of drying oil.

14. The foundry mix of claim 13, wherein said drying oil comprises oil-modified alkyd resin having a hydroxyl value of at least 25, wherein said polyisocyanate is aromatic polyisocyanate, and wherein said foundry mix also includes a catalytic amount of catalyst selected from the group of catalysts which accelerate the air drying of the drying oil, catalysts which accelerate the polyisocyanate cure, and catalysts which do both.

15. The foundry mix of claim 14 wherein:
   (a) said alkyd resin is a linseed oil modified alkyd resin containing at least 40 weight percent linseed oil based on the formulation weight of said alkyd, said alkyd resin having a hydroxyl value of 60–130;
   (b) wherein said aromatic polyisocyanate comprises diphenyl methane di-isocyanate; and
   (c) wherein said catalyst is a mixture of cobalt naphthenate and dibutyl tin di-laurate.

16. A cured foundry product containing sand as the major constituent and a binding amount of up to 10% by weight based on the weight of sand of a no-bake foundry binder composition, said binder composition having cured after being mixed with said sand; said foundry binder composition consisting essentially of:
   (a) as a first part, drying oil selected from the group consisting of synthetic drying oils, oil-modified alkyd resins, polyhydric alcohol esters of ethylenically unsaturated fatty acid, ethylenically unsaturated petroleum polymers, and mixtures thereof; and
   (b) as a second part, polyisocyanate; from 10 to 50 weight percent polyisocyanate being present based on the weight of drying oil.

17. The cured foundry product of claim 16, wherein said binder composition also includes a catalytic amount of metal naphthenate catalyst.

References Cited by the Examiner

UNITED STATES PATENTS

| | | | |
|---|---|---|---|
| 1,831,555 | 11/1931 | Earl | 22—194 |
| 2,936,293 | 5/1960 | Oath | 260—37 |
| 2,963,456 | 12/1960 | Betts et al. | 22—193 |
| 3,007,894 | 11/1961 | Bunge et al. | 260—40 |
| 3,075,926 | 1/1963 | Stewart et al. | 260—37 |
| 3,078,240 | 2/1963 | Hoshino et al. | 260—2.5 |
| 3,180,852 | 4/1965 | Pfirschkl et al. | 260—37 |
| 3,192,174 | 6/1965 | Nichols | 260—40 |
| 3,210,302 | 10/1965 | Bowell et al. | 260—37 |
| 3,218,274 | 11/1965 | Boller et al. | 260—22 |

FOREIGN PATENTS

| | | |
|---|---|---|
| 963,642 | 7/1949 | Germany. |
| 880,467 | 6/1953 | Germany. |
| 880,469 | 6/1953 | Germany. |
| 888,301 | 8/1953 | Germany. |
| 970,423 | 9/1958 | Germany. |

References Cited by the Applicant

FOREIGN PATENTS

| | | |
|---|---|---|
| 708,798 | 5/1931 | France. |
| 1,132,248 | 10/1956 | France. |

OTHER REFERENCES

Netherlands application No. 240,145 to Woodhead, laid open for public inspection, January 27, 1964.

J. SPENCER OVERHOLSER, *Primary Examiner.*

MARCUS U. LYONS, *Examiner.*